United States Patent Office 2,952,562
Patented Sept. 13, 1960

2,952,562

PROTECTIVE SILICATE COATING

Lester Morris, Whittier, and Flora Lombardo, Lynwood, Calif., assignors to Amercoat Corporation, South Gate, Calif., a corporation of California No Drawing. Filed Jan. 27, 1958, Ser. No. 711,126

6 Claims. (Cl. 117—62)

This invention relates to protective coatings of the silicate type, and particularly to methods and materials for curing such coatings.

This application is a continuation in part of our co-pending application Ser. No. 376,260, filed August 24, 1953, now abandoned, which is, in turn, a continuation in part of our application Ser. No. 296,244, filed June 28, 1952, now abandoned.

Protective coatings comprising the reaction products of alkali silicates with metals, such as zinc and lead and/or compounds thereof, have been used more or less extensively for protecting iron, steel and other surfaces against weathering and corrosion. In the use of such coatings, it has been common practice to subject the applied coating materials to heat treatment, preferably a baking treatment at a temperature of from about 200° F. to about 500° F. for sufficient time to cause the coating to become hard, impermeable and insoluble. Relatively small parts, which may be coated and subsequently subjected to heat treatment at the factory, may be effectively protected by such coatings. However, in the case of large structures fabricated in the field, as for example storage tanks, towers, structural steel frameworks and outdoor construction of various types, such heat treating of the coated surfaces is impracticable. Air drying under ordinary conditions fails to effect the required hardening and insolubilizing of the coating; and where structural parts must be shaped during installation, pretreatment of individual sections is not practicable because a previously applied coating becomes damaged by the bending and shaping incident to installation.

It is among the objects of the present invention to provide methods and materials for treating silicate coatings to cure the same to an adequate hardness, impermeability and insolubility after fabrication in the field, and without requiring heat treatment.

It is also an object of the invention to provide a curing agent which may be applied to a film of silicate coating material, and which will react therewith to produce a hard and insoluble surface coating for effectively protecting the coated surface from corrosion and other damaging reactions.

It is a further object to provide coating and curing materials which may be compounded in quantity for storage and shipment, and which may be readily applied by spraying or brushing on field installations, or by dipping prefabricated parts at the factory.

A still further object is to provide an agent which will quickly and effectively cure silicate coating materials, and produce a surface of bright and attractive appearance over which other coatings of the same or different character may be effectively applied.

The present invention contemplates the treatment of a film of coating material of the type of zinc silicate, lead silicate, and zinc-lead silicate when applied to a base or substrate, with a liquid curing agent comprising a solution of a salt capable of yielding an acid radical and which will react with the materials of the silicate film to effect hardening and insolubilization of the same.

While the curing agent may include as a solvent an organic water-miscible liquid, or water, or both, the amount of water present may be advantageously limited to an amount sufficient to cause formation of an acid reaction by hydrolysis of the dissolved salt, but not sufficient to cause impairment of the surface of the coating to which the curing liquid is applied.

In preparing the liquid curing agent of the present invention, the acid reacting salt may be either an inorganic or organic salt of a strong mineral acid, such as, for example, acid reacting salts of phosphoric, hydrochloric, nitric, sulfuric or chromic acids, or there may be an organic amine salt of such acids. Whichever type is used, the acid salt must be soluble in the organic or aqueous solvent employed, and must be capable upon hydrolysis of liberating an acid radical which will react with a silicate film of the character described to produce a hard insoluble coating. Care must be taken to avoid acidic salts which by hydrolysis release their acid radicals so rapidly, and in a concentration so great, as to cause stratification in the film before the curing effect is complete, or in which the pressure of excess water materially affects the film before the curing action is complete.

The vehicle in which the acid salt is dissolved may comprise either water or an organic water miscible compound in combination with a limited amount of water, such as, for example, a monohydric or polyhydric alcohol, ether, or ketone. There may be advantageously employed for this purpose, or example, aliphatic alcohols, such as methyl, ethyl, propyl, isopropyl, butyl, and higher alcohols. While isopropyl alcohol is preferred on account of cost and superior solvent properties, the other alcohols, may be used as well. Methyl alcohol, however, presents problems of toxicity, while ethyl alcohol involves higher costs, presence of denaturants, and other practical disadvantages. Glycols such as ethylene glycol or propylene glycol, and glycerol may be used. Water soluble ethers such as Carbitol, and dioxane have been found suitable. Water soluble ketones such as acetone and methyl ethyl ketone may be substituted with satisfactory results.

In a preferred embodiment of the present invention, the liquid curing agent comprises an organic vehicle such as an alcohol, containing only enough water to dissolve and aid the hydrolysis of the acid salt used. Such acid salt must be capable of yielding an acid radical which will react with the ingredients of a silicate film of the character of zinc silicate, lead silicate, and zinc-lead silicate, as for example the coating known commercially as "Dimetcote" and similar coatings produced by the reaction of alkali silicates with metals and/or metallic compounds. In said preferred embodiment, isopropyl alcohol is advantageously employed in admixture with a small quantity of water as the organic vehicle. A salt which has been found to be especially well suited to the purposes of the present invention is dibutylamine phosphate, produced by the reaction of di-n-butylamine with phosphoric acid. The active factor in this product is phosphoric acid, the acid radical of which will combine with ingredients of the silicate film to render the film hard and insoluble. Phosphoric acid, used alone, reacts with the zinc-lead silicate film too violently, with the result that the film is caused to crack and peel. When combined with an amine, however, the phosphoric acid radical is freed relatively slowly and in relatively dilute concentration by hydrolysis, so that its reaction with the silicate film is correspondingly retarded. It is believed that, if the reaction with the silicate film is too rapid, a differential shrinkage occurs within the film, and causes the surface to crack and/or peel before the underlying material fully reacts. When released slowly by hydrolysis, the acid radical appears to react with the film material substantially uniformly throughout its depth and area, probably because the solution has time to penetrate through the film and react with the underlying strata before the surface is hardened and rendered insoluble.

While the chemical reaction is complicated, and is not fully understood, it is believed that when the curing agent is sprayed or brushed over a silicate coating, a dehydration of the coating occurs. At the same time the dibutyl amine phosphate hydrolyzes into dibutylamine and phosphoric acid. As the acid radical is slowly released, it reacts with free alkali present in the silicate coating to form phosphate salts. Silicic acid is released from the alkali silicate of the coating, and the zinc and lead component is activated by the dibutylamine. The zinc or lead then reacts with the silicic acid to form zinc or lead silicates; and some of the phosphoric acid reacts with the lead or zinc to produce phosphates. At the same time, the released phosphoric acid serves to passivate the zinc or lead on the surface as well as any iron that may be present or exposed. As the dibutylamine phosphate hydrolyzes, the dibutylamine tends to volatilize, and thereby shift the equilibrium to release additional phosphoric acid for the cure.

In preparing the curing agent, the phosphoric acid and dibutylamine are preferably mixed in substantially molecular ratio to obtain maximum production of the dibutylamine phosphate in the solution. However, the amounts may be varied through a considerable range. Thus, phosphoric acid alone, without any of the amine, will react with the silicate coating; but will result in a cracking and/or peeling of the coating such as to render the coating unacceptable, and hence some amine must be present to modify the action. A slight excess of phosphoric acid is permissible so long as it does not unduly speed the reaction so as to cause cracking or peeling. An excess of the amine is not objectionable up to a ratio of about 1 part of acid to 2 parts of amine; but further excess amine increases cost with no beneficial result.

The presence of some water in excess of that available by dehydration of the silicate film is necessary to hold an adequate amount of the amine and amine phosphate in solution, and to aid the hydrolyzation of the salt. Excess water tends to react with and affect the original silicate film materials. A ratio of about 95 parts of alcohol to 5 parts of water is preferred, but the amount of water may be decreased somewhat, if desired, and may be increased to a point where no objectionable impairment of the final coating results. By increasing the amount of water, the amount of amine phosphate held in solution in the alcohol-water vehicle can be somewhat increased. It is desirable to increase the concentration of amine phosphate to the maximum possible without causing damage to the film by the presence of excess water. If some of the dissolved salt precipitates out of the solution, additional water may be added to dissolve it; or, preferably, the solution may be heated sufficiently to redissolve the precipitate.

In place of the di-n-butyl amine, it is practicable to use any amine which will react with phosphoric acid or its equivalent to produce an amine salt soluble in an organic solvent which is miscible with water and which will hydrolize in solution to yield an acid radical suitable for reacting with a silicate film to insolubilize the coating. For example, it has been found that dipropylamine, triethyl amine, morpholine, ethyl morpholine, monoethanol amine, triethanol amine and ethylene diamine may be used and will produce satisfactory results. The solubility in alcohol or its equivalent varies; and, where a substitute for the preferred amine is sought, variation in the solvent vehicle to obtain a solution of the amine of adequate strength and hydrolyzing property may be required. For commercial purposes, the availability and cost of the various materials in a particular market may determine the specific amine and the specific solvent most practicable for a particular locality.

In determining the availability of any particular amine for preparing the curing agent of the present invention, the selected amine and phosphoric acid are mixed in substantially molecular proportion to produce a saturated solution in alcohol or its equivalent containing only the commercially acceptable amount of water. If, at ordinary temperature, the salt formed by the reaction of acid and amine fails to dissolve or precipitates at normal temperature, water may be added in small increments until the salt is dissolved. Several formulas should be prepared in which the pH varies from 7 to 2, by increasing the excess of acid. The formulas are then tested by brushing the agent over silicate films, and washing off the cured coating at various intervals ranging from ½ hour to 24 hours. If specimens partially submerged in water do not crack or peel at the water line, the cure is considered adequate, and use of the substituted material is acceptable. Salt spray tests are desirable if severe service conditions are contemplated. In general, any amine which reacts with phosphoric acid to produce a phosphate salt soluble in alcohol containing only a relatively small amount of water, may be used. The availability of any particular amine for the purpose of this invention may be readily determined by testing as above indicated.

For some purposes, other acids and acid salts may be substituted for phosphoric acid and the acid salts thereof above described. For example, acid salts such as magnesium chloride, ammonium phosphate, aluminum sulphate, and other acid salts of hydrochloric nitric, sulphuric, and chromic acid, which are soluble in alcohol and its equivalent and by hydrolysis liberate an acid radical which will react with a silicate film of the character described to produce a hard insoluble coating, may be used. In making such substitutions, care must be taken to avoid acidic salts which by hydrolysis release their acid radicals so rapidly, and in concentration so great, as to cause stratification in the film before the curing effect is complete, or in which the presence of excess water materially affects the film before the curing is completed. Preliminary tests along the lines above explained will readily indicate the operability of various materials as substitutes for the preferred materials above noted.

In practice, the curing agent of the present invention is sprayed or brushed over surfaces previously coated with a silicate film of the character above described which has been air dried on the surface. The thickness of the silicate film is preferably kept between about 1.5 to 2.0 mils. Films of greater thickness, in the order of 2.0 to 3.0 mils, usually require an excess of the curing agent; and, for thicknesses of about 3.0 to 5.0 mils, an additional coat of curing agent should be applied. The curing agent is permitted to complete its reaction with the silicate film, and any excess is then washed off.

The insoluble coating so produced is of a hardness equal to, if not exceeding, that of a baked silicate coating, and is materially less costly. Additional coats of a similar nature may be applied over an initial coating, with satisfactory results. Coatings of other materials also may be applied, and afford good ahesion with a minimum of blistering.

The invention may be further illustrated by the following examples:

Example I

The curing agent may be prepared by mixing materials in the following proportions:

| Material | Volume (U.S. Gal.) | Weight (Lbs. Av.) |
| --- | --- | --- |
| Isopropyl Alcohol (99%) | 65 | 428 |
| Di-N-Butyl Amine | 16 | 100.8 |
| Phosphoric Acid (85%) | 16 | 196.00 |
| Distilled Water | 2.7 | 22.4 |

The alcohol, water and amine are placed in a mild steel tank or equivalent container, and the phosphoric acid is stirred carefully into the mixture. The mixture tends to become hot, but ordinarily will not boil. During the addition of the acid, a white fluffy salt sometimes appears; but, upon further stirring and the addition of further acid, the salt is dissolved. After the reaction is complete, the liquid product which results may be stored in glass, or terne plate. The phosphoric acid and di-n-butyl amine combine to form dibutylamine phosphate, which is dissolved in the alcohol and water.

*Example II*

A strong aqueous solution of magnesium chloride was prepared by dissolving approximately 65 lbs. of magnesium chloride hexahydrate, $MgCl_2 \cdot 6H_2O$, in an equal weight of water. The resulting solution contains approximately 30 to 32 percent of $MgCl_2$. When applied to a silicate coating this solution can be used for curing but care must be taken to avoid formation of white stains or bloom.

*Example III*

A solution of magnesium chloride in methyl alcohol was prepared by dissolving approximately 50 lbs. of salt in approximately 15 gallons of commercial methyl alcohol containing approximately 5% of water. This solution can also be used for curing in accordance with the present invention.

We claim:

1. A protective coating of the character described applied to a substrate and comprising: the reaction product of a dried film of silicate selected from the class consisting of zinc silicate, lead silicate, zinc-lead silicate and mixtures thereof with an acid radical released by hydrolysis from a substantially nonaqueous solution of an organic amine salt of an acid selected from the group consisting of phosphoric acid, sulfuric acid, hydrochloric acid, nitric acid and chromic acid in the presence of about 5% water.

2. A protective coating of the character described applied to a substrate and comprising the product resulting from the reaction of an acid radical released by hydrolysis from a substantially nonaqueous solution of an organic amine salt of an acid selected from the group consisting of phosphoric acid, sulfuric acid, hydrochloric acid, nitric acid and chromic acid, with a film of a silicate selected from the class consisting of zinc silicate, lead silicate, zinc-lead silicate and mixtures thereof, in the presence of about 5% water.

3. A protective coating of the character described applied to a substrate and comprising the reaction product of a phosphoric acid radical released by hydrolysis from a substantially nonaqueous solution of an organic amine phosphate with a film of a silicate selected from the class consisting of zinc silicate, lead silicate, zinc-lead silicate and mixtures thereof and convertible by reaction with said phosphoric acid radical in the presence of about 5% water to a hard insoluble coating.

4. A protective coating of the character described applied to a substrate and comprising the reaction product of a film of silicate selected from the class consisting of zinc silicate, lead silicate, zinc-lead silicate and mixtures thereof, and a solution of dibutylamine phosphate in an organic solvent, said solution being miscible with water, and capable of yielding an acid radical in the presence of a silicate film to produce a hard, insoluble coating the proportion of water to said amine salt solution being about 5 percent.

5. The method of curing a silicate coating selected from the class consisting of zinc silicate, lead silicate, zinc-lead silicate and mixtures thereof, which comprises applying to said silicate coating an alcohol solution of the reaction product of phosphoric acid and an organic amine, said solution containing about 5% water.

6. The method of coating a metal structure which comprises: applying to the surface of said structure a coat of a silicate material selected from the class consisting of zinc silicate, lead silicate, zinc-lead silicate and mixtures thereof, the thickness of said coat not exceeding about 2 mils, air drying said coat, and then applying to said coat a film of a curing agent comprising an alcohol solution of an organic, acidic, amine salt of an acid selected from the group consisting of phosphoric acid, sulfuric acid, hydrochloric acid, nitric acid and chromic acid subject to hydrolysis in the presence of said coat to release an acid radical which will react with said coat to harden and insolubilize said coat.

References Cited in the file of this patent

UNITED STATES PATENTS

| | | |
|---|---|---|
| 71,210 | Pelletier | Nov. 19, 1867 |
| 419,657 | Gesner | Jan. 21, 1890 |
| 963,810 | Sala | July 12, 1910 |
| 2,576,845 | McDonald | Nov. 27, 1951 |
| 2,688,598 | McNeely | Sept. 7, 1954 |
| 2,717,843 | Wachter et al. | Sept. 13, 1955 |